US005476617A

United States Patent [19]

English et al.

[11] Patent Number: 5,476,617

[45] Date of Patent: Dec. 19, 1995

[54] ROTATIONAL AND VIBRATIONAL PROCESS FOR MOLDING CELLULOSIC FIBERS

[75] Inventors: Brent English, Stoughton; Charles G. Brey; Larry D. Hjelter, both of Menomonie; Ulo H. Vaher, Rockland; Charles E. Yost, Menomonie, all of Wis.

[73] Assignee: The Board of Regents of the University of Wisconsin, Menominie, Wis.

[21] Appl. No.: 19,680

[22] Filed: Feb. 19, 1993

[51] Int. Cl.$^{6}$ .................................................... B29C 43/08

[52] U.S. Cl. ............................. 264/37; 264/69; 264/101; 264/122; 264/310; 264/311; 264/319

[58] Field of Search ............................. 264/69, 311, 122, 264/37, DIG. 69, 101, 310, 319

[56] References Cited

U.S. PATENT DOCUMENTS

| | | | |
|---|---|---|---|
| 3,280,237 | 10/1966 | Corbin et al. | 264/109 |
| 3,718,536 | 2/1973 | Downs et al. | |
| 3,746,589 | 7/1973 | Reinke | 264/69 |
| 3,891,738 | 6/1975 | Shen | 264/101 |
| 3,981,955 | 9/1976 | Otani et al. | 264/310 |
| 4,058,580 | 11/1977 | Flanders | 264/113 |
| 4,316,865 | 2/1982 | Battigelli et al. | 264/109 |
| 4,379,101 | 4/1983 | Smith | 264/40.3 |
| 4,393,019 | 7/1983 | Geimer | 264/109 |
| 4,466,853 | 8/1984 | Hartmann et al. | 156/381 |
| 4,517,147 | 5/1985 | Taylor et al. | 264/83 |
| 4,605,467 | 8/1986 | Böttger | 156/497 |
| 4,738,895 | 4/1988 | Takada et al. | 428/288 |
| 4,751,034 | 6/1988 | DeLong et al. | 264/115 |
| 4,850,849 | 7/1989 | Hsu | 425/407 |
| 4,923,656 | 5/1990 | Held | 264/70 |
| 5,019,311 | 5/1991 | Koslow | 264/122 |
| 5,147,722 | 9/1992 | Koslow | 264/122 |
| 5,154,968 | 10/1992 | DePetris et al. | 264/122 |

FOREIGN PATENT DOCUMENTS

| | | | |
|---|---|---|---|
| 0051498 | 5/1982 | European Pat. Off. | 264/69 |
| 53-121022 | 10/1978 | Japan | 264/69 |
| WO9404335 | 3/1994 | WIPO | 264/69 |

*Primary Examiner*—Allan R. Kuhns
*Attorney, Agent, or Firm*—Cushman Darby & Cushman

[57] ABSTRACT

A molding process and apparatus produces molded parts from cellulosic fibers. A dry process molds cellulosic fibers including the steps of mixing the cellulosic fibers and a binder to form a substantially homogeneous mixture; distributing the mixture to a desired pre-form, preferably having a non-uniform cross-section; and molding the pre-form, under a predetermined pressure and heat, to form a molded part having a substantially uniform density. A distribution assembly distributes the mixture to a desired pre-form by rotational and/or vibrational motion. The rotor on the upper surface of the telescoping portion of the distribution assembly cylindrically rotates to mechanically move the mixture in a desired pre-form shape. The rotor may be unevenly weighted such that as it rotates, the distribution assembly vibrates thereby mechanically distributing the mixture by causing it to settle in the cartridge in the desired pre-form shape.

22 Claims, 16 Drawing Sheets

UNLOAD
0403
DISTRIBUTION PLUNGER
MOTORS
164
165
INDEX
0402
0303
AIR JET
0302
EJECT 2
0301
MOLD
EJECT
0300
FRL
PNUEMATIC SCHEMATIC

ROTATIONAL AND VIBRATIONAL PROCESS FOR MOLDING CELLULOSIC FIBERS

BACKGROUND OF THE INVENTION

1. Field of the Invention

The present invention relates to a process and apparatus for molding cellulosic fibers and the product produced by the process and, in particular, a process for molding recycled cellulosic fibers.

2. Description of the Related Art

Processes for molding mixtures of cellulosic fibers and binders are known. Methods for applying a resinous binder to cellulosic fibers typically include: a wet method and a dry method. The wet method of applying the binder requires dissolving the binder in a solvent, such as water, and spraying the binder onto the fibers. In the dry method, the dry resinous binder is blended with the cellulosic fibers without the addition of a solvent, prior to forming a molded mat or part. In each of these methods the cellulosic fibers are laid by air into a mold.

Several problems are associated with the wet method. The solvent must typically be removed from the fibers prior to entraining the fibers into an air stream as the fibers are placed in a mold. The removal of the solvent disadvantageously results in removal and thus waste of part of the binder making it difficult to properly include the correct amount of binder. Also, wet fibers are difficult to process as they tend to agglomerate.

The dry method does not involve these drawbacks of the wet method and in that regard is the preferable method.

One type of the dry method, as disclosed in Caron et al., U.S. Pat. No. 3,230,287, is a conventional air-laying process for manufacturing moldable fibrous panels. Caron et al. disclose air-laying wood fibers mixed with a thermoplastic or thermosetting resin. The Caron et al. process produces a moldable fibrous mat of uniform thickness.

Among the problems associated with the here-to-for conventional dry air-laying methods is that the dry resin binder will separate from the cellulosic fibers during the air-laying process. To compensate for this separation, excess resin is required in the attempt to achieve the desired resin content in the finished fiber and resin mix. However, the use of excess resin is likely to result in the nonuniform distribution of the resin, which results in deficient mechanical properties of the finished product.

One method proposed for overcoming the problem of the resin separating from the cellulosic fibers is to simultaneously feed cellulosic material and a dry resin-containing air stream to a comminuting means. Mtangi et al., U.S. Pat. No. 4,647,324, disclose such a simultaneous feeding process whereby the resin and cellulosic material are both retained in the comminuting means for a sufficient period of time to avoid separation so that the resin is uniformly deposited over the surface of the cellulosic particles during air-laying into a fiber web. The Mtangi et al. web is then molded at pressures of 180–250 psig into a molded article having a uniform distribution of resin.

A disadvantage of the Mtangi et al. process is that the mixture of dry resin and cellulosic material has little or no flow properties and is, therefore, very difficult to properly place into a mold and to then press into a molded part from the flat fiber web.

Another known approach involves a two-step dry process for producing a unitary-rigid composite board from shredded paper containing thermoplastic material. Downs et al., U.S. Pat. No. 3,718,536, disclose the initial formation of a pre-form by heating a batt of shredded paper containing thermoplastic material to 300°–350° F., which is above the softening temperature of the thermoplastic material, and thereafter subjecting the batt to pressures of 10–60 psig. The Downs et al. process subsequently presses the pre-form to its desired density having a uniform distribution of thermoplastic material. Downs et al. fails to teach, however, the formation of a molded part.

Thus, a molding process and apparatus have yet to be provided that enable the formation of a molded part of cellulosic fibers and a resinous binder.

SUMMARY OF THE INVENTION

An object of the present invention is to provide a molding process and apparatus that enables the formation of a pressure molded part comprised of cellulosic fibers and a resinous binder.

Another object of the present invention is to provide a sequential molding process and the apparatus that enables the formation of a pre-formed product that distributes a prepared cellulosic mixture into a pre-form followed by the molding of a cellulosic part, whereby the part can be made with a uniform thickness or alternatively can have non-uniformly thick areas located in desired locations within the molded part, while maintaining a substantially uniform density throughout the molded part, even in the non-uniformly thick areas.

Another object of the present invention is to provide a cost-efficient process and apparatus for molding articles from recycled cellulosic fibers, such as recycled paper, disposable diaper scraps or other forms or sources of cellulosic fibers.

A further object of the present invention is to provide a process and apparatus for producing a molded article having a substantially uniform high density and high mechanical strength as well as a product that is itself recyclable and repulpable.

Another objective of the present invention is to provide an environmentally sensitive process and apparatus for producing molded parts that make use of recycled materials in a manner that is effective and efficient.

In accordance with the present invention, a molding process and apparatus for producing molded parts of cellulosic fibers and a binder are provided. The present invention is a dry process that employs pressure and heat to accomplish the molding.

The process centers around a series of steps beginning with the measuring of a predetermined quantity of a cellulosic mixture, a pre-forming step where the mixture is uniformly distributed and a pre-formed product prepared, a molding step and then the collecting of the finished molded parts. The present invention is designed to mold cellulosic fibers into a useful product that can have a variety of shapes or cross-sectional configurations and uniform density.

It should be noted that the pre-forming and molding steps can be performed in the same device or at the same stage or, alternatively, could be performed using separate, movable pre-form containers as is discussed more fully hereafter.

The binder, if used, can be one or a mixture of adhesive substances which increase fiber bonding and mechanical properties. The particular binder used is not critical and may be chosen from a variety of materials which can, for example, include lignin based adhesives, agricultural by-products, synthetic polymers, thermoplastic polymers and thermosetting resins such as thermosetting amino- and phenol- formaldehyde resins. Preferably, the binder is high density polyethylene or polypropylene with the binder having a variety of forms, preferably, fiber form.

The cellulosic fiber may be derived from any paper, wood or other cellulosic containing material. While it is preferred to employ previously recycled material or material being recycled, from a variety of sources, any cellulosic material can be used and can include recycled paper, forms of recycled cellulosic, hammer milled material, various waste products, such as, for example, from paper pulp producers, from diapers or other fibrous material.

Prior to mixing, the cellulosic material, in whichever form it is being used, is processed into fibers and fiber bundles and fiber fragments. The exact source of cellulosic fibers is not critical but dry hammer milled paper fiber is preferable to conventional wet pulping as conventional wet pulping of recycled paper requires a great deal of water. This water has to be thoroughly processed afterwards or must be carefully monitored and controlled in a closed system.

It is important to properly move and distribute the mixture of cellulosic fibers and binder (hereafter called material whether or not binder is added) to and within a desired pre-form device designed to replicate the cross-sectional shape of the finished product. We have found that use of agitation or a force to move the fibers, both initially during removal of the cellulosic material from a supply hopper and some continuing fluffing during movement of the material into a pre-form tube helps assure the desired movement of the material and prevents clumping of fibers. This helps assure a distribution arrangement and compaction level at the pre-form stage that is helpful to achieve the desired molded product. Preferably, a distribution plunger partially enters a cartridge having a hollow, central bore. A preform tube and cartridge will then receive a predetermined amount of material which is then distributed. This is to assure that sufficient material will be positioned at all areas within the pre-form so that those areas desired to have either a uniform or a non-uniform shape will be properly supplied and that the density throughout the final part will be as uniform as possible regardless of the cross-sectional shape and its uniformity or non-uniformity. To aid in this distribution of the material, and of the fibers therein, the lower plunger structure can rotate or vibrate, or rotate and vibrate. The material may then be compacted into a preform by plungers before molding.

Other objects, features and characteristics of the present invention, as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in various figures.

DESCRIPTION OF THE PREFERRED EMBODIMENTS

The present invention is directed toward producing products or parts, such as end wall closures for various types of containers, from recycled cellulosic fibers. In carrying out this objective, it is desirable to reduce the cellulosic material into fibers, fiber bundles and fiber fragments (hereinafter called fibers). This can be accomplished by a number of methods, including, for example, use of a hammer mill, and/or screens.

The fibers may then be strengthened with a binder, it can be mixed with an appropriate binder by use of conventional mixers such as ribbon mixers, paddle agitators, "V" or round tumblers and vortex mixers or an airless sprayer. Regardless of the binder mixing techniques, a substantially homogeneous final mixture is desired. It is important to not allow the cellulosic fibers to clump together or become compacted at this stage. A pigment or colorant, such as a dye or tint, may be added by mixing it with the binder prior to application to the fibers or it may be separately added during mixing, or added to the fiber alone.

Figure 1:
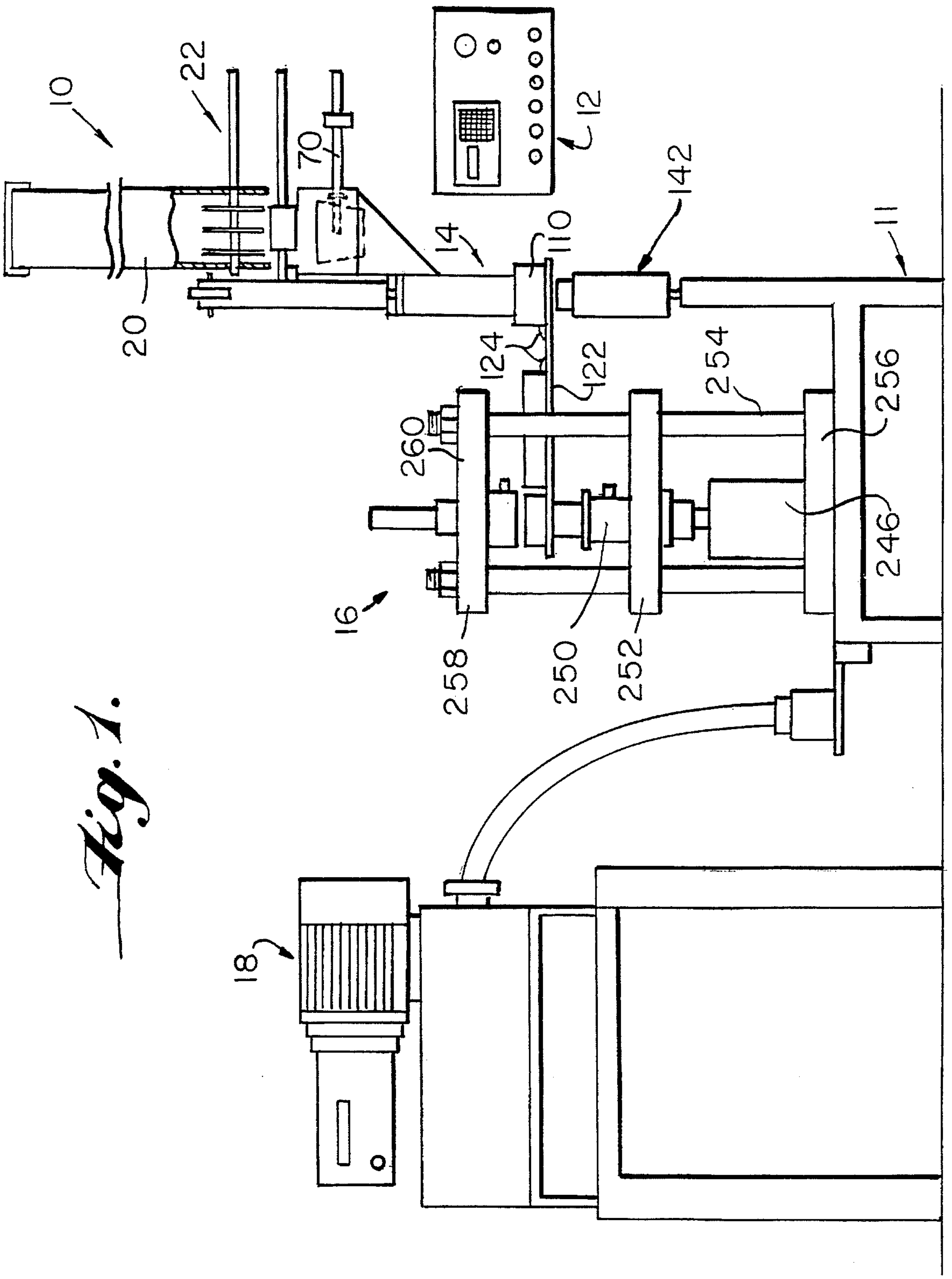
FIG. 1 is a side elevational schematic view of apparatus for carrying out the molding process of the present invention.

FIG. 1 shows an overall side elevational of the apparatus used to carry out the process associated with the present invention. This apparatus is comprised of several subassemblies including a charging assembly, generally shown at 10, a control system, generally indicated at 12, the pre-form assembly, generally indicated at 14, and a molding or press section, generally shown at 16, with a pneumatic/hydraulic system being generally shown at 18. These subassemblies can be separated from one another but cooperate together and can be connected to a common frame. However, it is possible to incorporate the charging, pre-form and molding phases into a single unified subsystem so that the individual functions would then be combined together.

Figure 4:
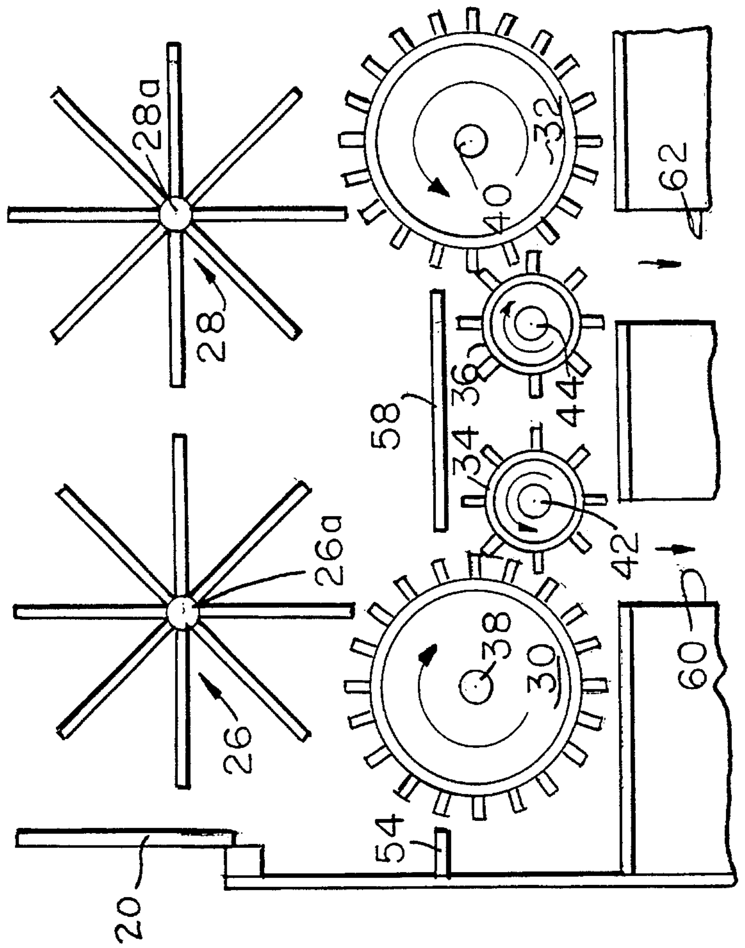
FIG. 4 is a cross-sectional view taken along line 4—4 in FIG. 2.
Figure 2:
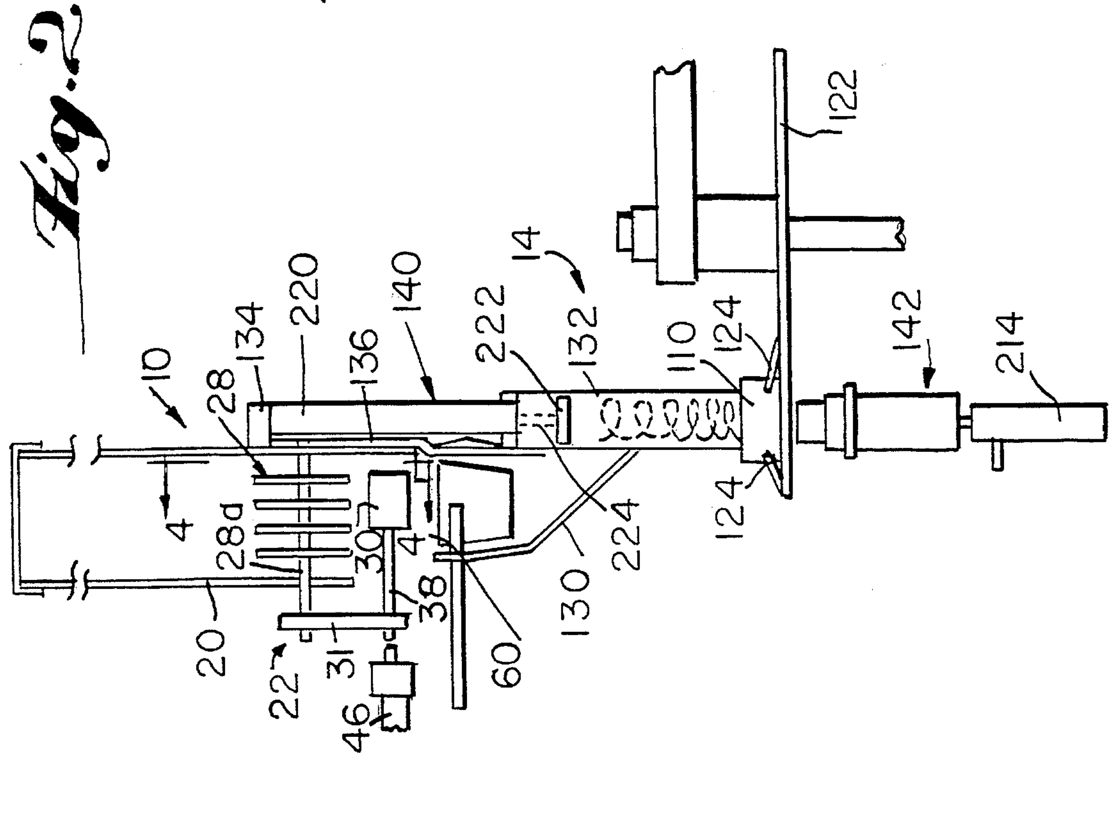
FIG. 2 is an enlarged side elevational view of the hopper and pre-forming assembly.
Figure 3:
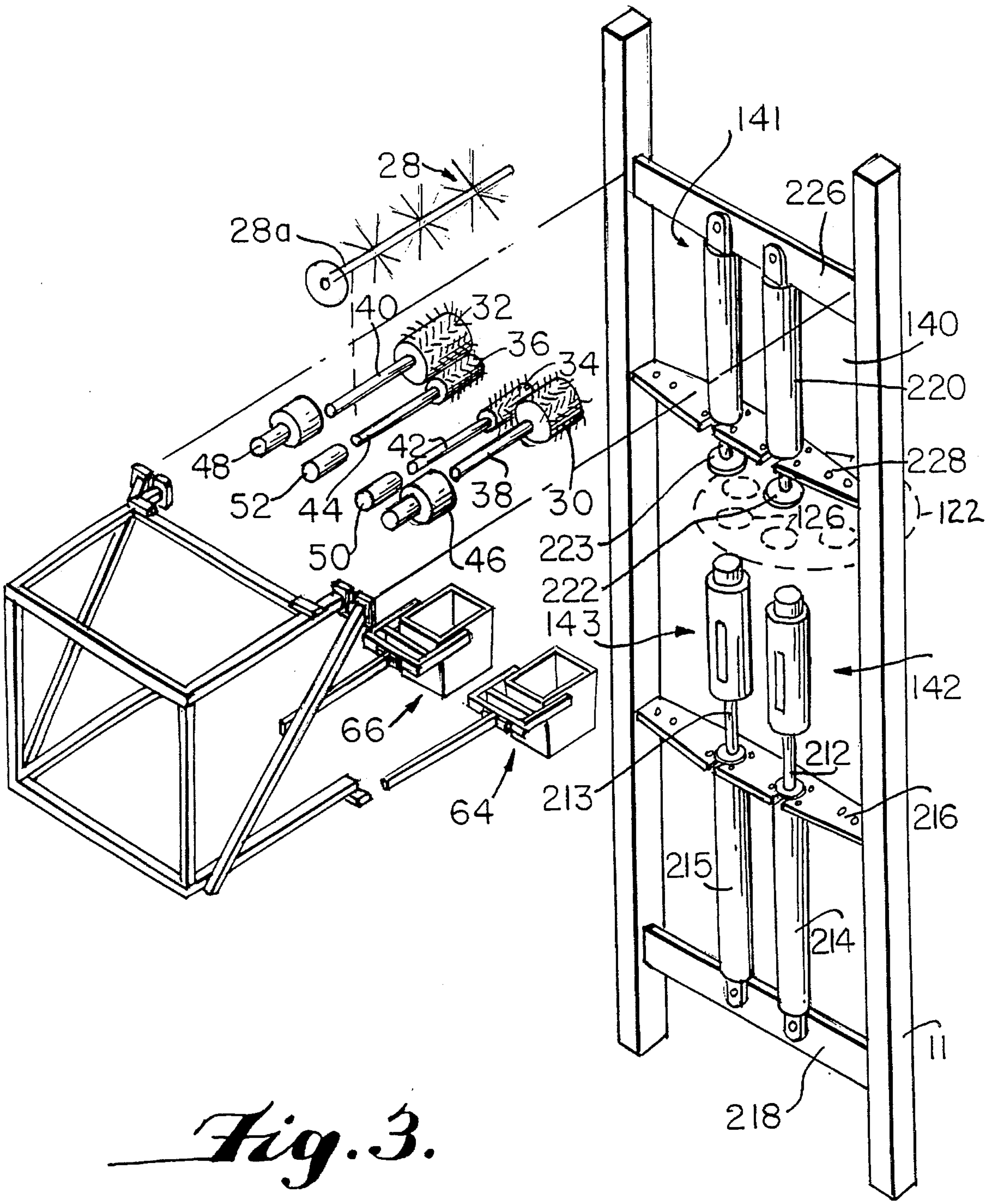
FIG. 3 is an exploded perspective view of a portion of the apparatus of FIG. 2.

The charging assembly 10 is shown in more detail in FIGS. 2–4 and includes a hopper 20, a material withdrawal unit, generally shown at 22, and a weighing assembly, generally shown at 64. As referenced above, material will be initially placed into the hopper 20.

The material can vary between a light, fluffy condition that will not appreciably pack and a mixture that could be quite dense so that the weight of the material in the hopper could compact the mass adjacent the bottom of the hopper. Accordingly, in order to release material, and to fluff the material as it is removed from the hopper, a pair of rotatably mounted beater members, 26 and 28, are provided in the bottom of hopper 20 as shown in FIGS. 1–4. These beater members are attached to drive shafts **26*a* and 28*a*, respectively, and are driven, preferably in unison, at a speed of about 5 rpm, by motors 46 and 48, shown in FIG. 3 by any suitable drive such as a conventional chain or belt drive or the gearing shown at 31 in FIG. 2**.

Mounted directly below the beater members are a series of bristle covered rollers that cooperate together to effectively form a small carding mill. The series of carding mill rollers are comprised of two, larger diameter outboard mill rollers 30 and 32 as well as two smaller interior rollers 34 and 36. These rollers are attached to drive shafts 38–44, respectively, and, in turn, to drive motors 46–52, respectively, for rotating the rollers at a rate of about 15 rpm although other rates of rotation could be used depending upon the density of the cellulosic material.

As shown in FIG. 3, the interior rollers 34 and 36 are mounted so that they rotate within an area associated with the lower half of outboard rollers 30 and 32. Rollers 30 and 34 comprise one set while another set is comprised of rollers 32 and 36.

As noted previously, each of the carding mill rollers 30–36 are bristled and are provided with an exterior that includes relatively stiff pins or projections, comprised of a material such as, for example, mild steel, but other materials could be used provided the projections are strong enough to pull the material from the hopper.

In order to properly feed the material to and around rollers 30 and 32, the bottom of hopper 20 includes wall portions 54 and 56 outboard rollers 30 and 32 as well as a wall 58 in between rollers 30 and 32. Beneath the series of rollers is the hopper outlet comprised of chutes 60 and 62 into which the material passes from the rollers. The bottom surfaces of hopper 20 surrounding chutes 60 and 62 can be flat, as shown in FIG. 4, or those bottom surfaces could be angled or sloped toward the inlet to each of chutes 60 and 62 as shown in dotted lines in FIG. 4.

Figure 5:
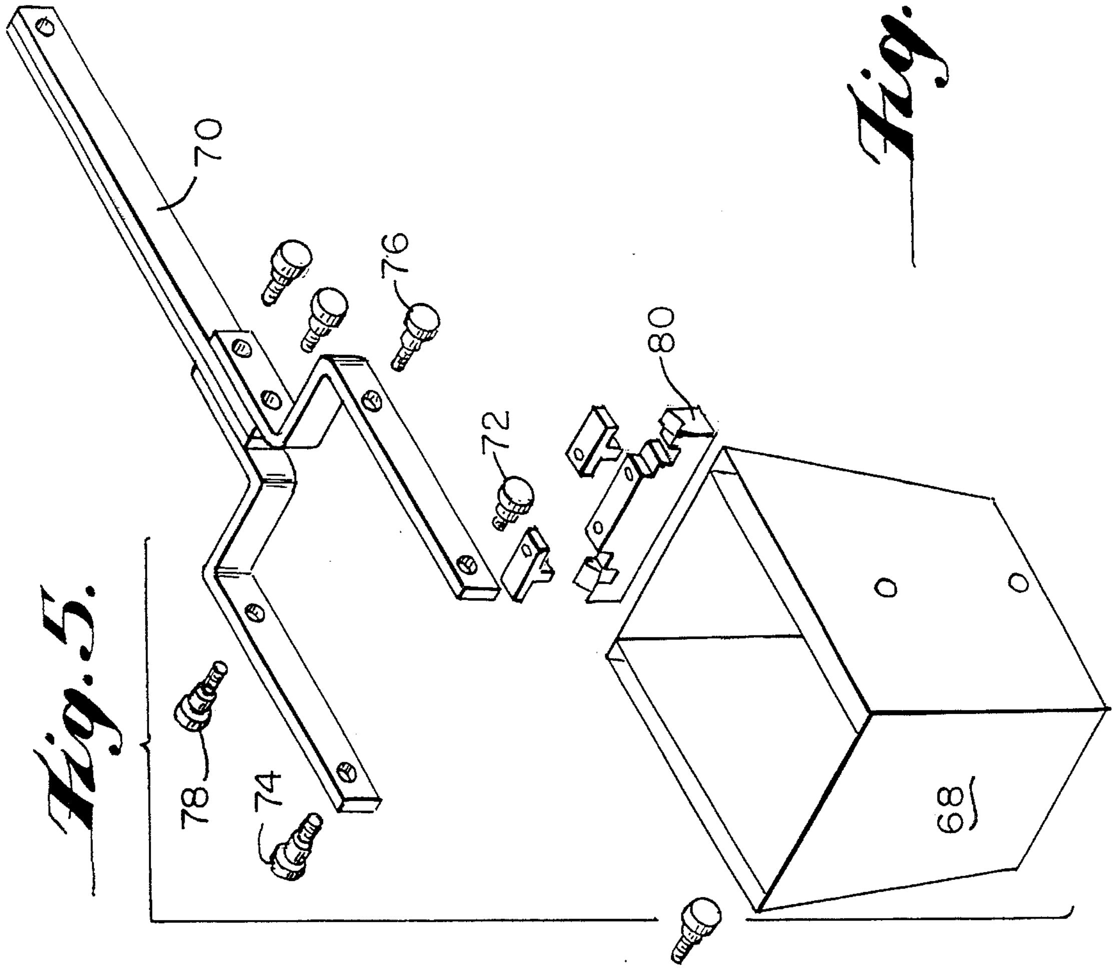
FIG. 5 is an exploded perspective view of the mixture measuring bucket.

The cellulosic material passing through chutes 60 and 62 flows into a measuring section in the form of two bucket assemblies 64 and 66. Since each are the same only one is shown in detail in FIG. 5. Each bucket assembly includes a bucket 68 mounted to a support arm 70 by a pin on each side, 72 and 74, respectively, that will allow the bucket to rotate. The support arm itself is pivotally mounted by pivot pin connections 76 and 78 to a knife edge support 80. The arms 70 can then be suitably weighted and when a desired amount of the material has been received by a bucket 68 the arm will rotate and the bucket itself will rotate to dump the desired amount of the material into the pre-form section. The amount of the material that is transferred by each bucket 68 is an amount that is appropriate for one molded part.

This measuring occurs during the transfer of the material from hopper 20 to a pre-form tube 132 in order to assure that products of like size and shape are prepared from equal amounts of the material and have a substantially equal cross-sectional density. This assures uniformity between parts and consistency during this phase of the manufacturing process.

Once the material is measured the process first involves the formation of a pre-form of the material. This imparts a level of handling ability to the material so that it can be moved or used in the molding or press stage of production at a more remote location from where the pre-form was made. The pre-form is prepared within a hollow ring called a cartridge one of which is generally shown at 110 in FIG. 6.

Alternatively, molding could occur directly at this pre-form stage. If it was desired for molding to occur at this point, the molding and press steps, described hereafter, would be initiated at this point directly within the pre-form tube 132, and/or cartridge 110.

Production line techniques could employ a plurality of movable pre-form cartridges and one or more pre-form tube assemblies to produce the pre-formed material.

Figure 6:
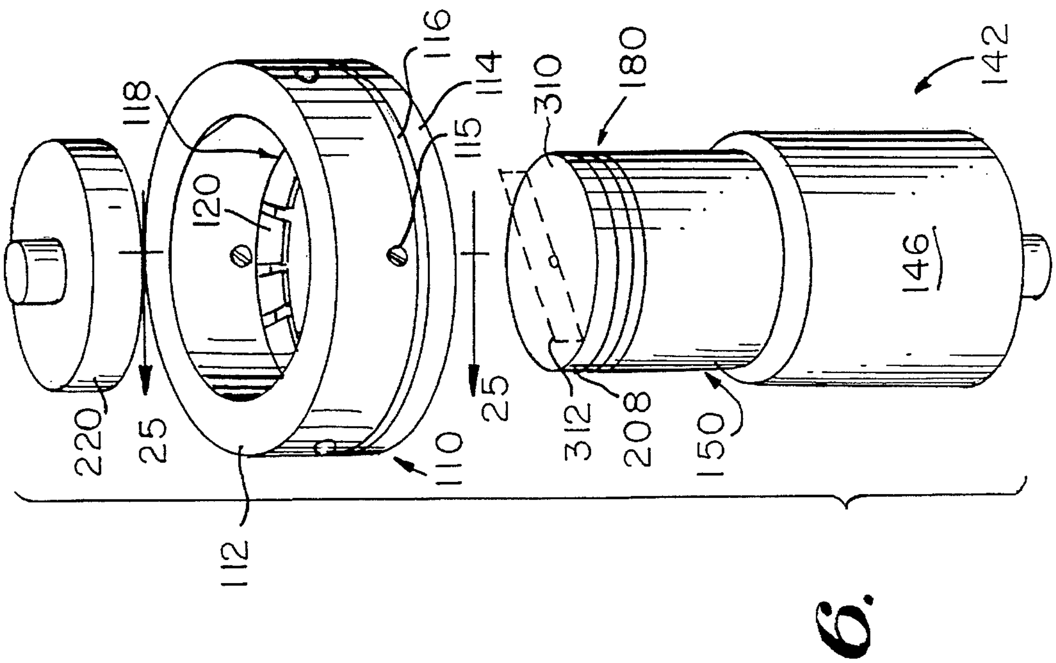
FIG. 6 is an exploded perspective view of a portion of the pre-form apparatus.

Each cartridge 110 is preferably comprised of a cylindrical member 112, as shown in FIGS. 1, 2 and 6, which serves as the primary structure of the cartridge 110. The cylindrical member 112 has a wall thickness, ranging from about one quarter to about one inch.

The cartridge 110 is preferably comprised of metal, and preferably aluminum, although other pressure and heat impervious materials could be employed such as thermoset plastics composite materials or other metals.

Each cartridge 110 includes a bottom ring 114. The outer portion of the upper edge of the ring 114 is milled so that when the ring 114 is mounted to the bottom of cylindrical member 112 and held in place by screws 115 an annular recess or groove 116 will result that extends around the circumference of cartridge 110. This groove 116 allows the cartridge to be removably held on a movable indexing table 122 by clamps 124 that will engage groove 116. It should be understood that other approaches could be used to secure cartridges 110 onto the indexing table 122 such as spring clips or a friction retaining ring which could itself be secured onto the table 122 about openings 126 provided within table 122. The cartridges could then be inserted into such a ring and be held in place by friction.

Figure 24:
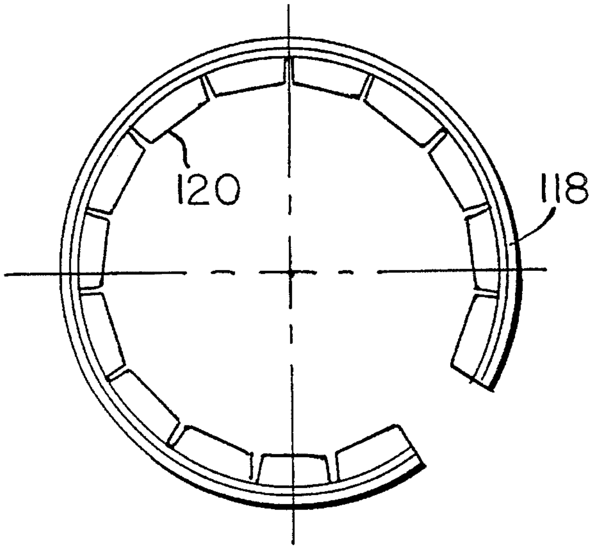
FIG. 24 is a plan view of a flexible retaining member of a cartridge provided in accordance with the invention.
Figure 25:
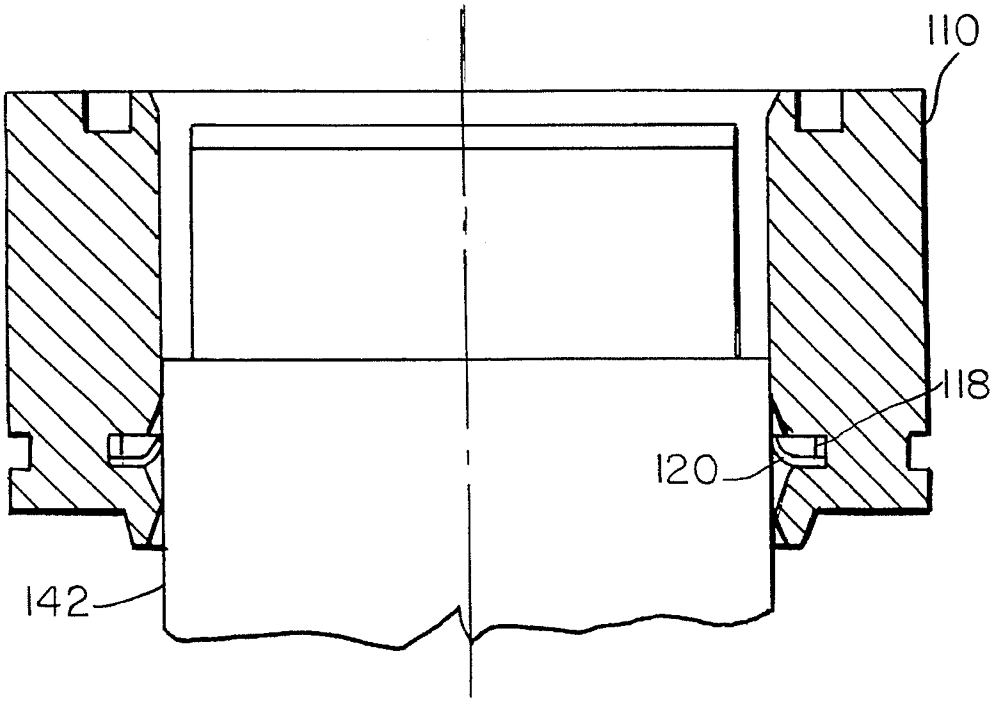
FIG. 25 is a cross-sectional view taken along line 25—25 in FIG. 6 of a cartridge of the invention, shown with a plunger assembly inserted therein.

Another purpose of ring 114 is to hold a flexible retainer member 118 in between the ring 114 and the cylindrical member 112. The flexible member 118 includes a plurality of tabs 120 that extend radially into the interior of the hollow center of the cartridge 110 as shown in FIG. 6. FIG. 24 is a plan view of the flexible retaining member 118. FIG. 25 is a sectional view of a cartridge 110 including the retaining member 118, shown with the tabs 120 biased upward to accommodate plunger assembly 142, as will become apparent below. The flexible member can be comprised of a natural or synthetic rubber, a flexible polymer or a flexible or bendable thermoplastic. The function of the inwardly extending tabs is to hold the pre-form within the cartridge, following the pre-forming step and to also hold the molded product within the cartridge after molding is completed and the molded part is transferred into the cartridge until the indexing table 122 has moved to the discharge station and it is desired to remove the molded part from the cartridge for collection.

Figure 18:
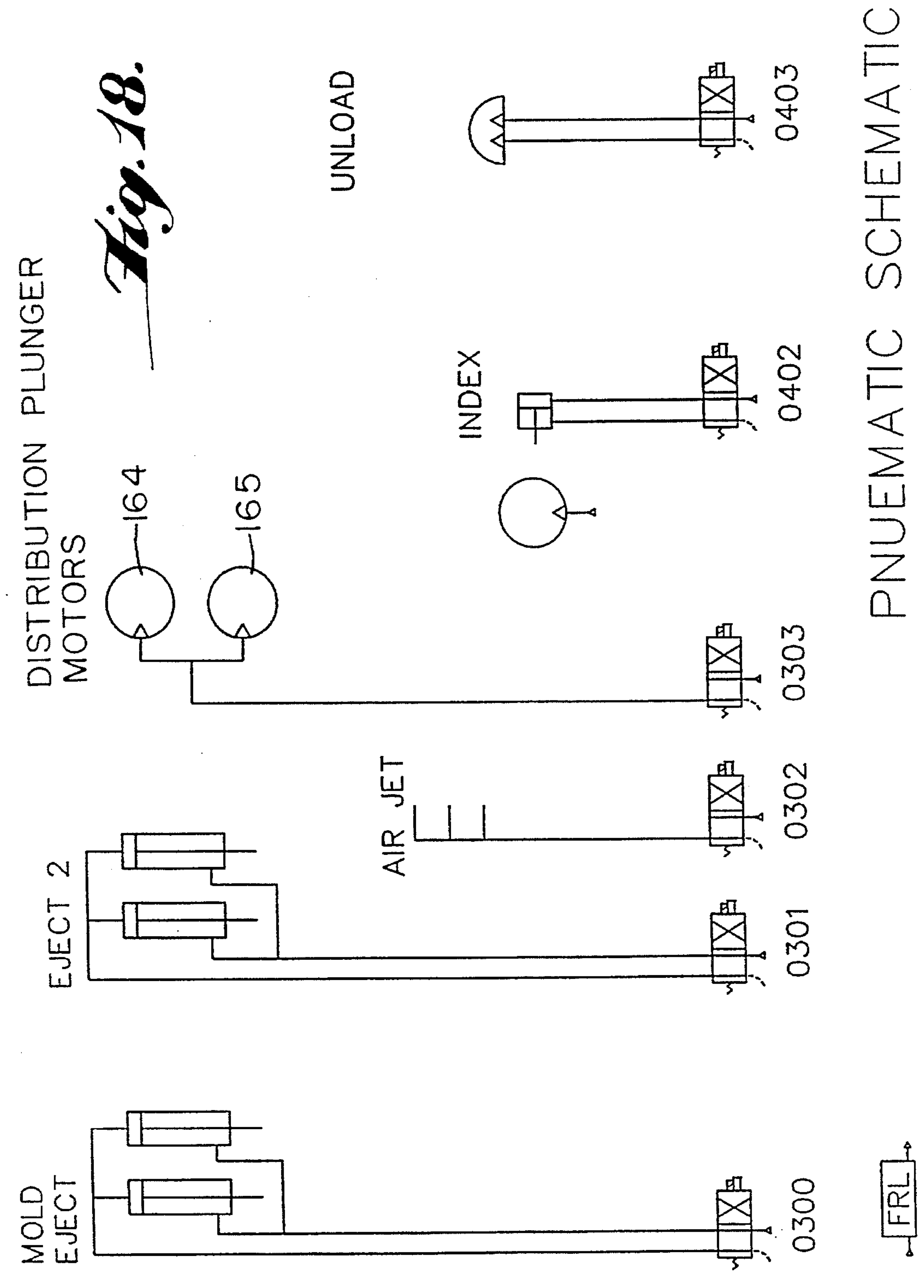
FIG. 18 is a pneumatic schematic for use with the present invention.
Figure 19:
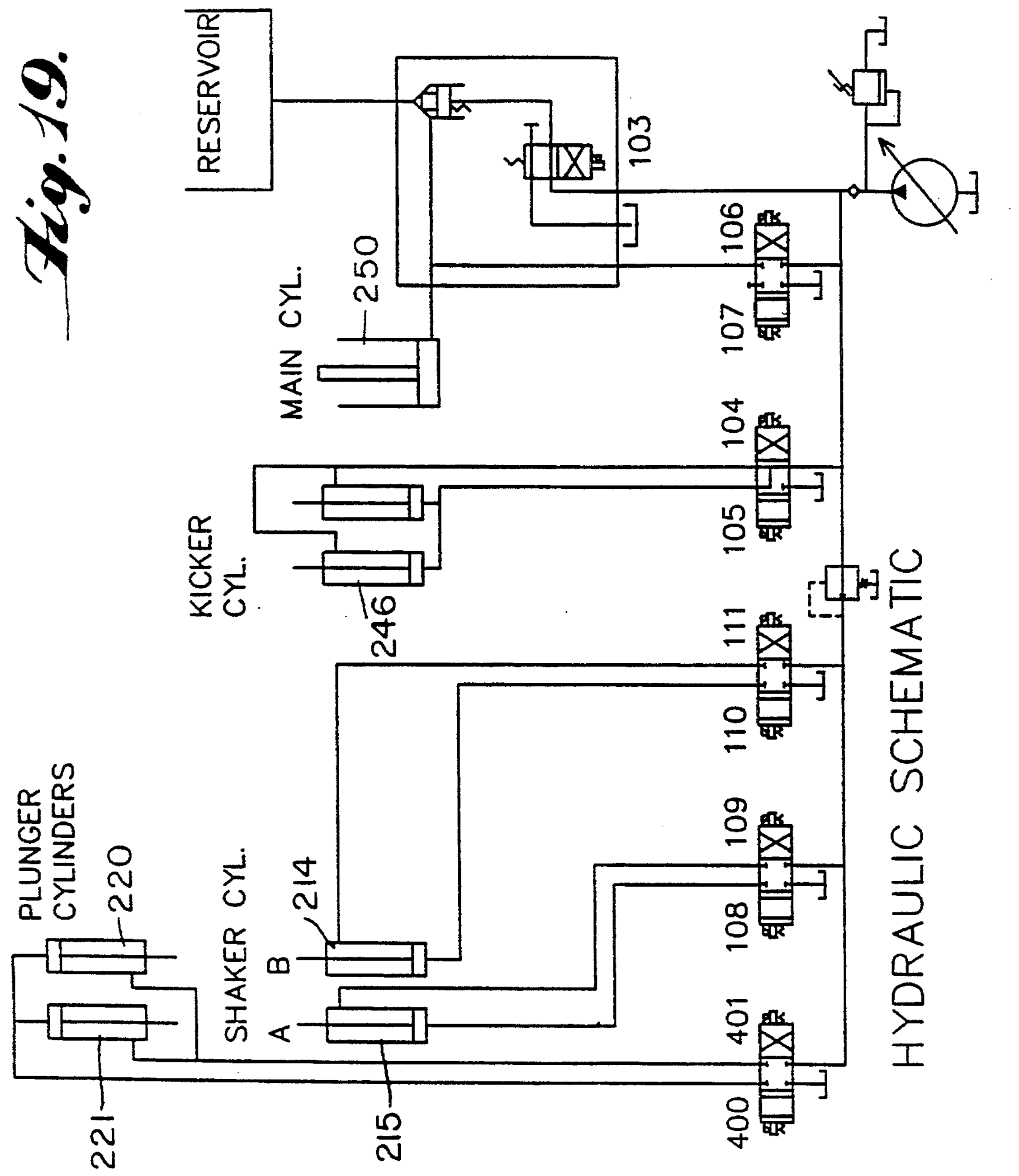
FIG. 19 is a hydraulic schematic for use with the present invention.
Figure 20:
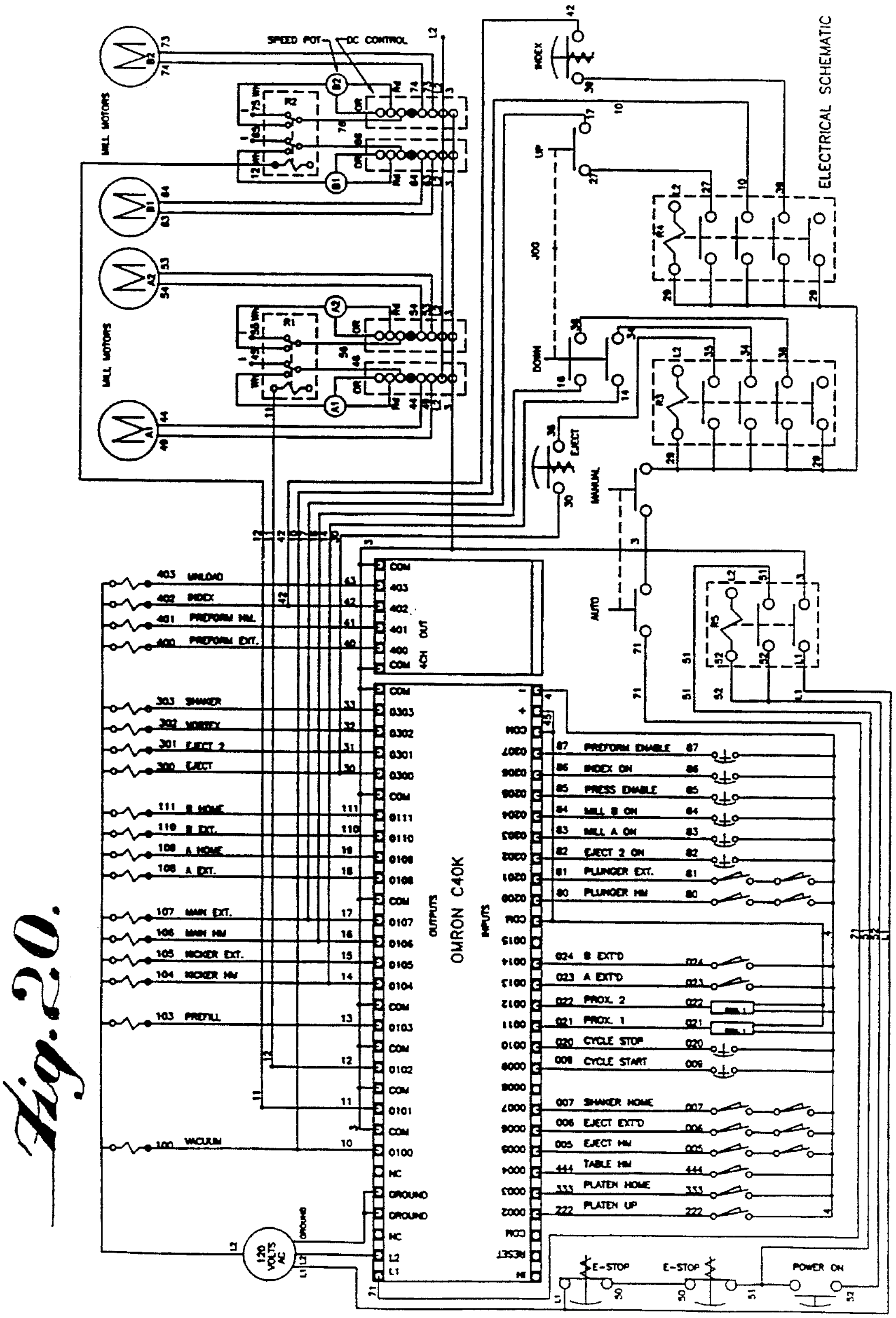
FIG. 20 is an electrical schematic for use in the present invention.
Figure 21:
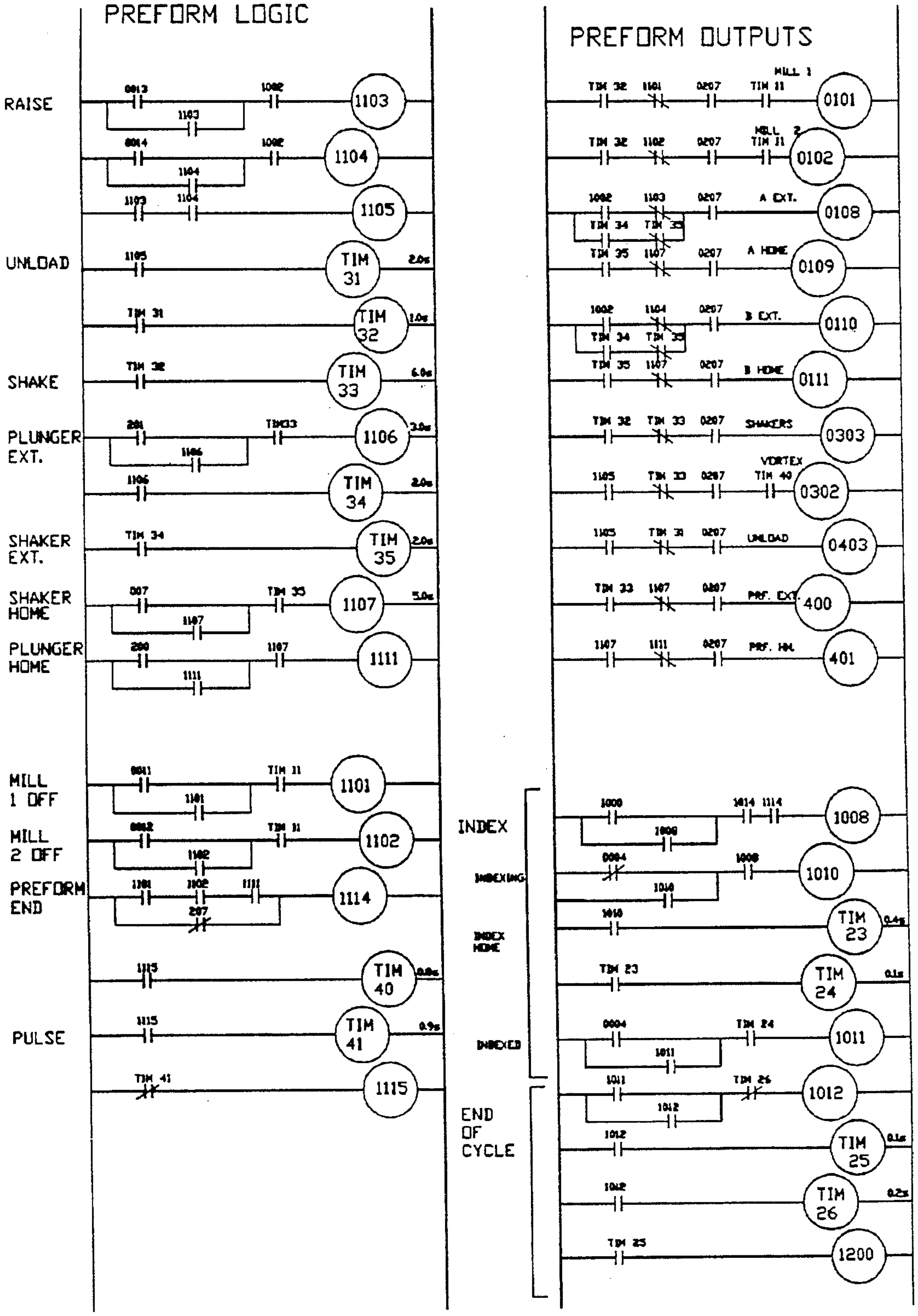
FIG. 21 is the pre-form cycle logic and output ladder diagrams for use with the present invention.
Figure 22:
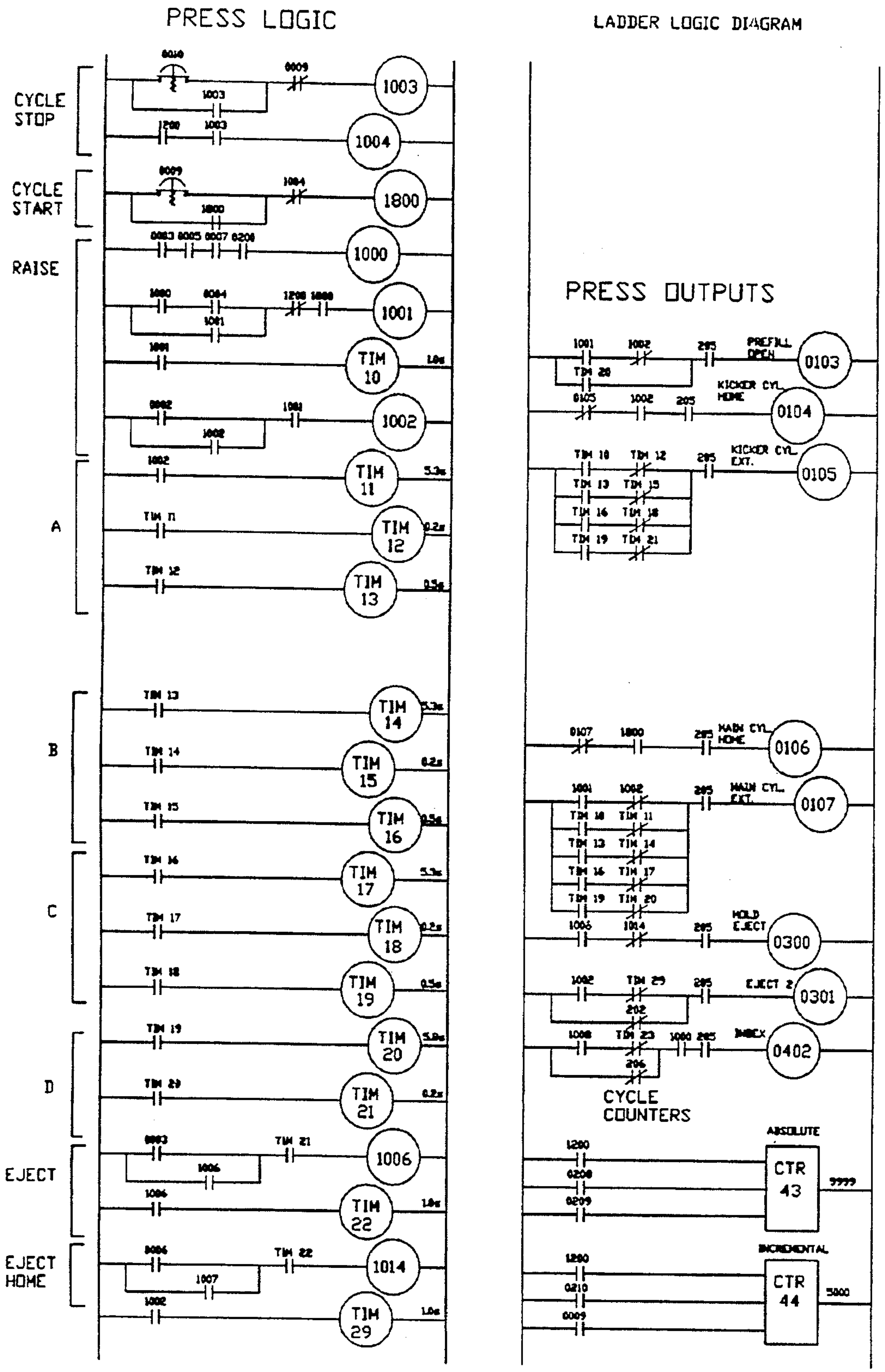
FIG. 22 is the press cycle logic and output ladder diagrams for use with the present invention.
Figure 23:
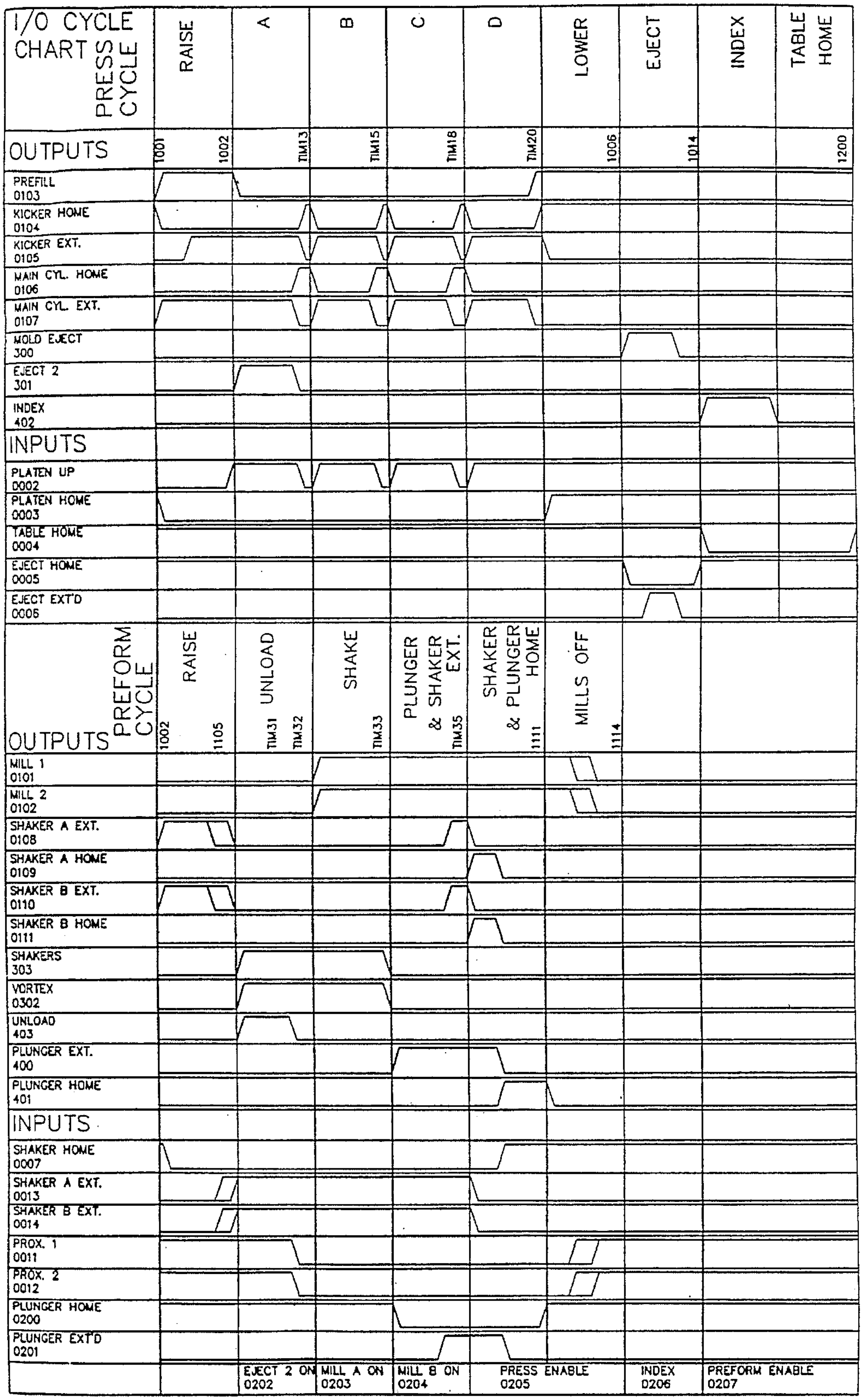
FIG. 23 is an input/output cycle timing chart for use with the present invention.

The cycle times of the various steps in the metering system, the pre-former and finally in the molding press, are set forth in FIG. 23. The components of the pneumatic and hydraulic systems are shown in FIGS. 18 and 19. The various drive motors, controlling relays and micro-switch inputs are under the control of a programmable controller 130, shown in the circuit diagram of FIG. 20, all of which are part of the control system 12.

The preferred type of programmable device is an Omron C40K controller but other similar or equivalent type devices could be used. Pressures, temperatures, step intervals and part weights can be set and adjusted by varying the input to the controller as well as physically by adjusting hardware such as varying the weight used on the arm on the trip scale metering device, and pressure adjustment screws.

The material is transferred from the hopper 20 by actuating carding mill motors 46–52 and causing the rollers 30–36 to pull material from the bottom of the hopper. Desired amounts of the material are weighed by the bucket assemblies which then rotate 180 degrees to completely dump their contents into the outlet chute 130. Outlet chute 130 is connected into the pre-form tube 132 where a forced jet of air, in the form of a vortex, from an air supply 134 via tube 136 that terminates at a suitable nozzle, aids further fluffing and distribution of, the material within the top of the pre-form tube 132.

Once a pre-determined amount of the material is transferred to the pre-form tube 132 by gravity and the forced air vortex from air tube 136, located at the top of the pre-form tube, the material will fall downwardly within pre-form tube 132 thus filling the pre-form tube 132 by the combined force of the air and by gravity.

The pre-form assembly, generally shown at 14 in FIGS. 1 and 2, includes the pre-form tube 132, a top plunger assembly 140, a distribution plunger assembly 142 located below the indexing table 122 and axially aligned with the top plunger assembly 140 and aligned as well with a cartridge 110 mounted on table 122 and an associated opening 126 in table 122, as shown in FIGS. 1–3, 7 and 8. A shaped pre-form will be produced within the pre-form tube, and specifically within the cartridge 110 by the combined pressure of the top plunger 140 and the lower distribution plunger assembly 142 of the pre-determined amount of material transferred to the pre-form tube 132.

Figure 7:
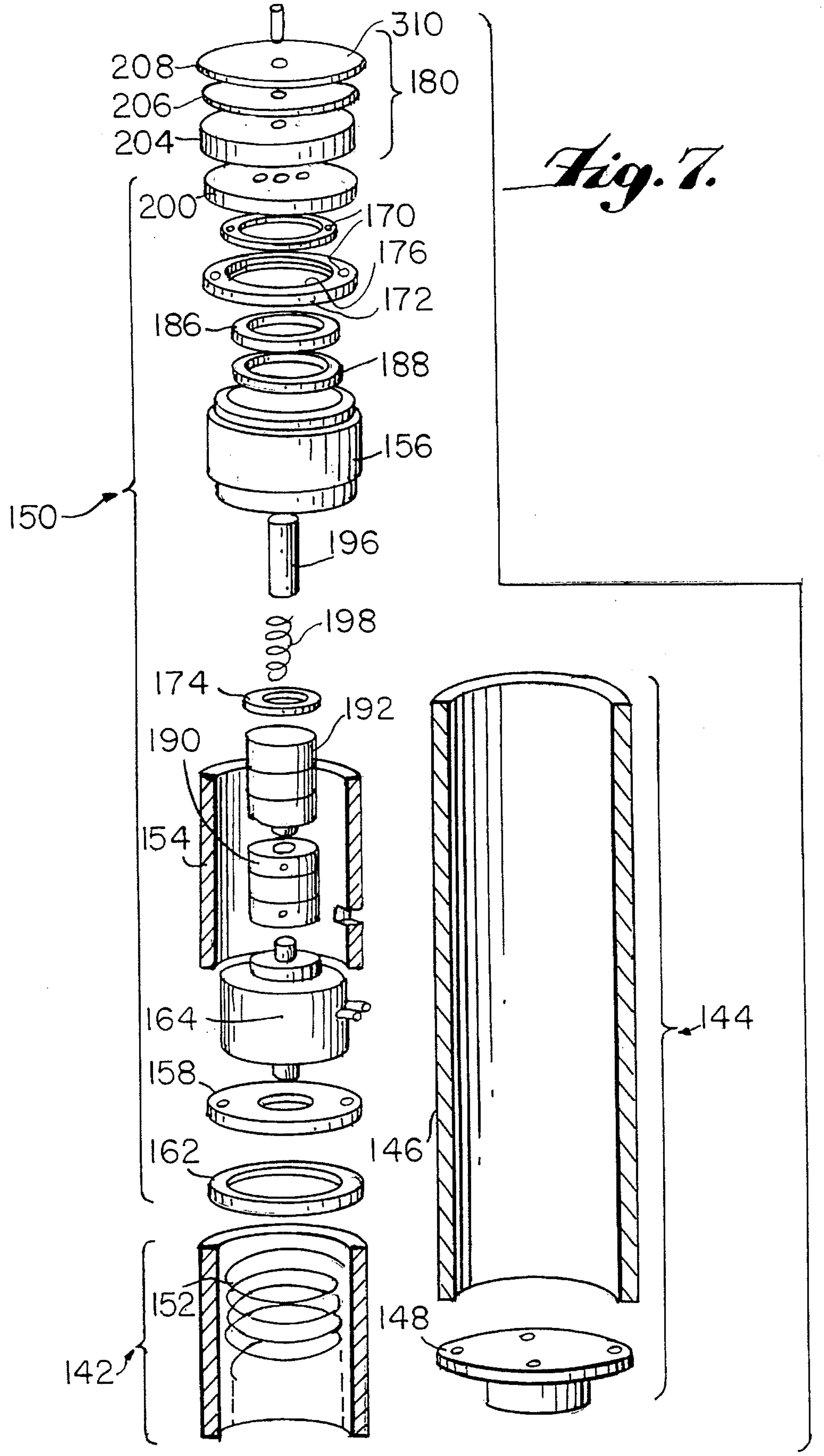
FIG. 7 is an exploded perspective view of the distribution/shaker plunger.
Figure 8:
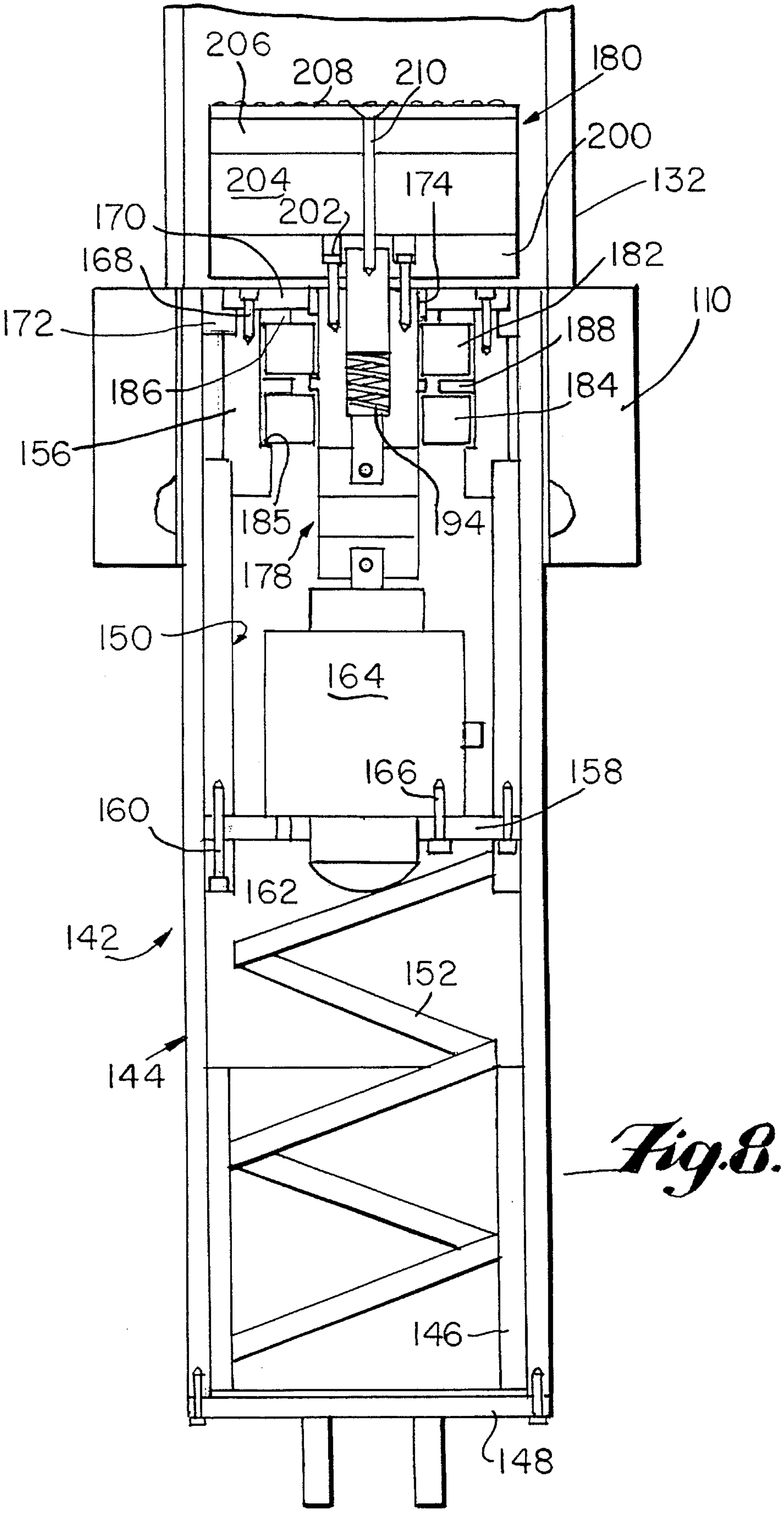
FIG. 8 is a cross-sectional view of the distribution/shaker plunger in an assembled form.

As shown in greater detail in FIGS. 7 and 8, the distribution plunger assembly 142 is comprised of an outer mounting tube assembly 144, comprised of an outer tube 146 and a base 148, in which an inner telescoping assembly 150 is slidably retained. The diameter of both the outer mounting tube 146, as well as telescoping assembly 150, is such that each will fit into the interior diameter of a cartridge 110 as shown in FIGS. 8 and 9–11.

The telescoping assembly 150 is pushed normally outwardly, relative to the outer mounting tube assembly 144, by spring 152 which operates between base 148 and the bottom of telescoping assembly 150.

FIGS. 7 and 8 set forth a sectional view of distribution plunger assembly 142 and FIG. 8 includes the relationship between the distribution plunger assembly 142, the pre-form tube 132 and cartridge 110.

The telescoping assembly 150 is comprised of a lower mounting tube 154 and an intermediate tubular portion 156 which are secured together by convenient means such as screws (not shown). They could also be press fit together. A base plate 158 is attached by screws 160 to the bottom of tube 154 and a flange 162 is mounted beneath base plate 158 by the same screws 160. Base plate 158 also serves as the mounting support for a motor 164 which is held to plate 158 by screws 166.

Mounted to the top of intermediate tube 156, by screws 168, is a top plate 170 which in turn holds a mounting ring 172 in place. A bearing 174, mounted on the interior of an aperture 176 provided in top plate 170, centers and provides a rotational bearing surface for the top of the motor drive connection, generally shown at 178, between motor 164 and the top piston assembly, generally shown at 180.

The drive connection 178 rotates along with the top piston assembly 180 and is spaced from the interior of tube 156 by annular bearings 182 and 184 that are retained by an undercut shoulder 185 adjacent the bottom of the interior of tube 156 and by rings 186 and 188. The drive connection 178 includes a lower portion 190 and an upper portion 192 that are pinned together by a connection at the base of the upper portion 192. The upper portion has a hollow interior bore 194, which extends down to the pin connection, and receives therein a connection member 196 and a spring 198.

The top piston assembly 180 includes a base member 200 that is attached by screws 202 to the top of the upper portion 192 of the drive connection 178. The piston 180 also includes one or more cylindrical spacer members, such as those shown at 204 and 206, as well as a top platen 208. The top platen and the spacer members removably mounted on the base member 200 by a screw 210. The number and height of the spacer members 204 and 206 can be adjusted to accommodate variations in the size and dimension of the part being pre-formed as well as the pressures desired to be created during pre-forming. With reference to FIGS. 1–3, the distribution plungers 142, 143 are shown, each being connected by a drive rod 212, 213 to a hydraulic control cylinder 214, 215. Cylinders 214, 215 are, in turn, mounted to brackets 216, 218 and thus to main frame 11.

With reference still to FIGS. 1–3, the pre-forming assembly 14 also includes the top plunger assembly 140 that is comprised of a drive cylinder 220 and a piston 222 mounted on a drive arm 224. As shown in FIG. 3, two top plunger assemblies 140, 141 are used as well as two drive cylinders 220, 221, and two pistons 222, 223. Drive cylinders 220, 221 are each connected between mounting brackets 226, 228 and then to frame 11.

A plurality of cartridges 110 could be carried by the indexing table 122 and moved sequentially beneath the pre-form tube 132 where each would pause. During that pause a pre-form shaped part would be created within the confines of the cartridge.

The molded part produced by the process of the present invention will frequently not have a uniform cross-section but it is desirable to have a substantially uniform density across the entire cross-section formed. In order to obtain the variety of cross-sectional shapes, it is necessary to distribute the material 240 within the pre-form tube 132 relative to pistons prior to pressing because the material has no consistent flow characteristics that can be relied upon to provide the distribution that is necessary to produce molded parts and products having thickness variations in their cross-sectional shape. The pre-form step distributes the material into a desired pre-form shape.

Figure 9:
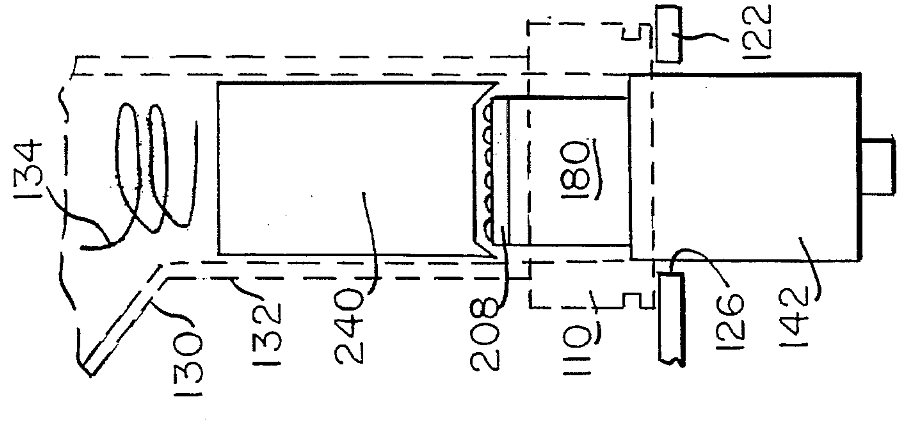
FIG. 9 is a diagrammatic cross-sectional view of the first stage of pre-forming.

FIGS. 9, 10, 11 and 12 illustrate the operational sequence followed for the equipment to produce a pre-form. Turning first to FIG. 9, a predetermined amount of material has been removed from hopper 20 by the carding mill end rollers 30–36 and is being transferred to pre-form tube 132 by an air jet provided by air tube 136 and also, to some extent, by gravity. The pre-form tube 132 is preferably acrylic although other materials, such as other plastics, paper, reinforced tubing or metal tubing could also be used.

At the beginning of the pre-form stage the top plunger assemblies 140, 141 have had their respective pistons 222, 223 retracted to their home positions out of pre-form tube 132. Likewise, each top piston assembly 180 of distribution plungers 142, 143 have been extended or raised to their maximum position by the hydraulic cylinders 214, 215 and by spring 152. When outer tube 146 is positioned within the cartridge 110 piston 180 will be located within the bottom of pre-form tube 132.

Figure 10:
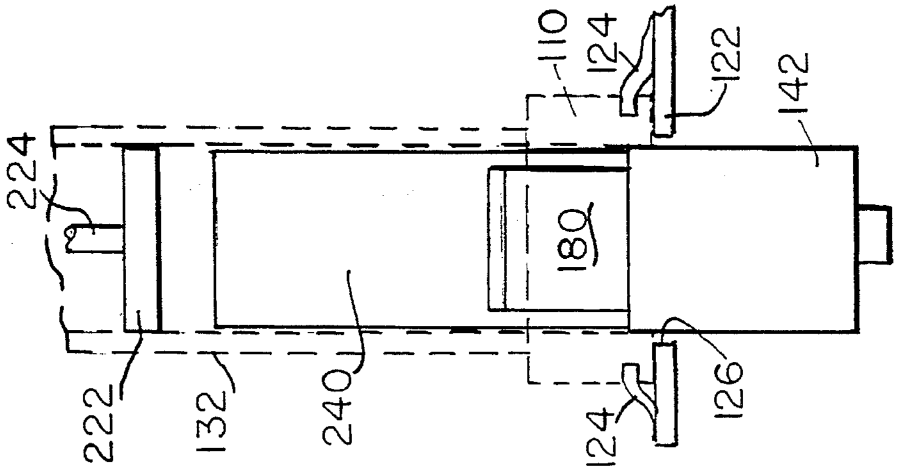
FIG. 10 is a diagrammatic cross-sectional view of the next pre-form stage.

FIG. 10 shows the distribution of the material 240 once piston assembly 180 is rotated; preferably at a speed ranging between, about 200 to 2000 rpm. The cylindrical motion of piston assembly 180 causes some of the material 240 to move toward the outer edges of the pre-form tube 132 and the vertical sidewalls of the piston assembly 180 within the cartridge 110. In FIG. 10, the telescoping assembly 150 and the piston assembly 180 are still substantially fully extended from the tube 142. The upper plunger 220 enters the pre-form tube 132 from the top but is not yet compressing the material 240. In a typical process, the piston assembly 180 rotates for 3–4 seconds.

The material 240 is caused to settle and compact by a vibrating and/or rotating motion of the distribution plunger which can be caused by an eccentrically weighted rotary member 204 of assembly 180.

Figure 11:
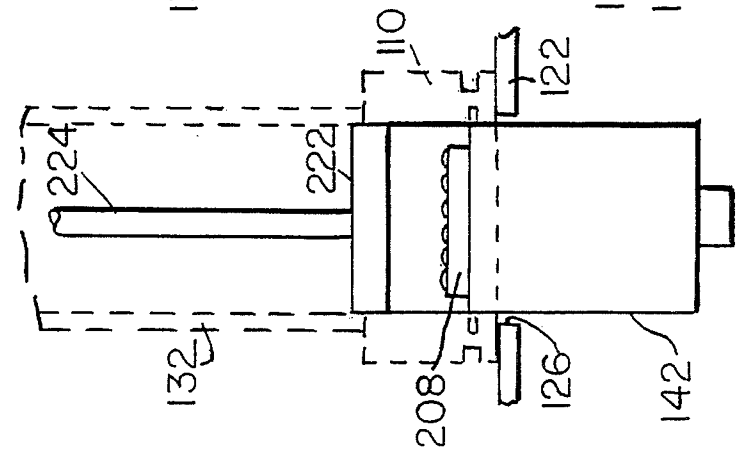
FIG. 11 is a diagrammatic cross-sectional view of the next pre-form stage.

In FIG. 11, the piston assembly 180 has stopped its rotation cycle and top plunger assemblies 140, 141 are actuated thus extending or lowering pistons 222, 223 onto the material within pre-form tube 132. This compresses the material 240 and produces a downward movement of the material in the pre-form tube 132. As the material is compressed, the portion adjacent the sides of the piston assembly 180 will also be compressed as the pressure from pistons 222, 223 overcomes the spring force of springs 152. When springs 152 have been fully compressed, as in FIG. 11, from the material for the pre-form will have been moved to a position entirely within the cartridge 110. In a typical process, pistons 222, 223 compresses the material 240 for 1–2 seconds at 300 psi but, pressures of 10 to 1000 psig can be utilized to compress the material.

Figure 12:
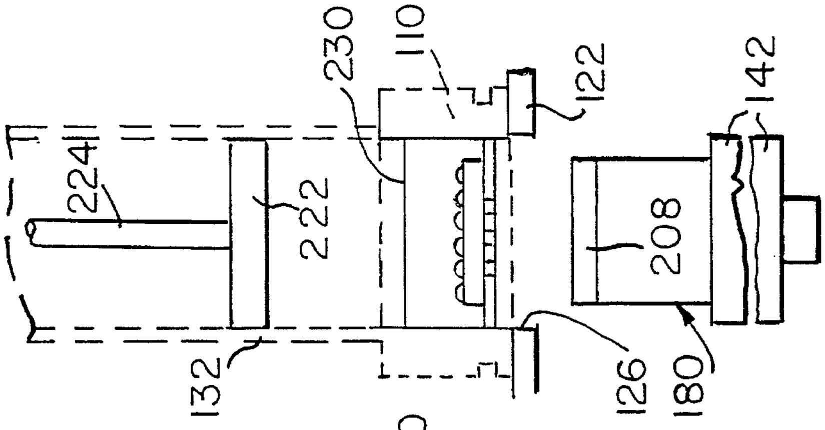
FIG. 12 is a diagrammatic cross-sectional view of the final pre-form stage.

FIG. 12 illustrates the final step of the pre-form operation where the piston 222 and the distribution plunger 142 are removed from the cartridge 110. Piston 222 returns upward to its retracted home position. Hydraulic cylinder 214, retracts the distribution plunger 142 to its home position. As the distribution plunger 142 is removed from the cartridge 110, the telescoping assembly 150 moves to a position fully extended from the outer tube 142 because the pressure is removed from the spring 152. A pre-form 230, having more of the mixture in its outer periphery, rests within the cartridge 110.

Several variations to make the pre-form are possible. For example, pressure can be applied to the mixture by an air vortex rather than the plunger of the preferred embodiment. If an air vortex is used to initially compress the mixture into a pre-form, a rotor is not required, but may still be used, if desired.

The cartridge 110 then transfers the pre-form 230 to the molding step by rotating index table 122. The pre-form 230 housed in the cartridge 110 is transferred to a press 242 and subjected to pressure from which is formed a molded part. Once a molded part is formed, it is ejected from the mold into cartridge 110 by an ejection assembly (not shown).

The pre-form is transferred to the press 242 by indexing of a cartridge, which is rotated by index table 122. An idle station on the index table 122 is present for the application of laminates or coatings, if desired. For example, a repulpable coating or film can be added to the pre-form to provide a barrier or for cosmetic reasons.

Figures 13, 14, 15, 16, 17:
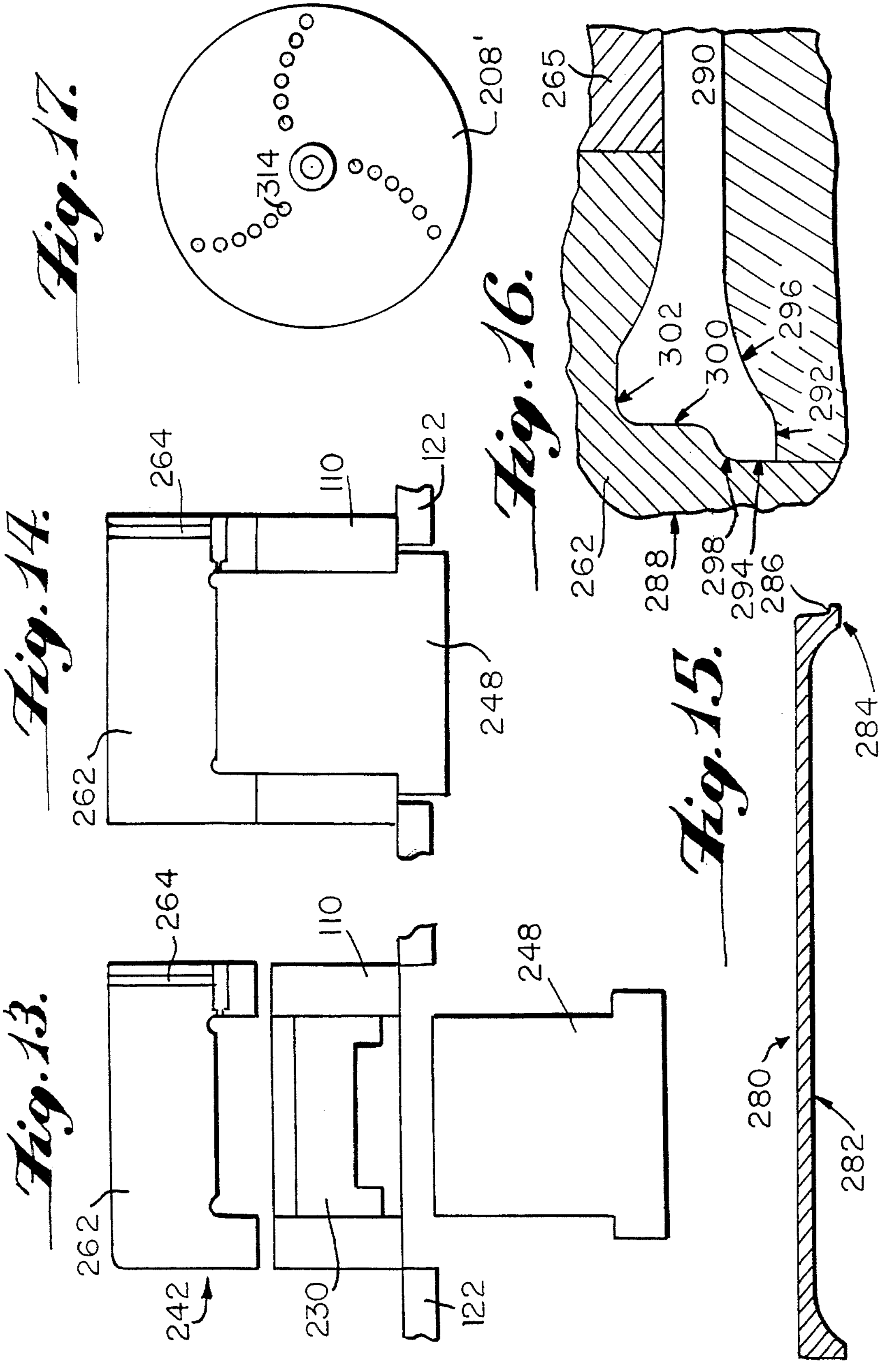
FIG. 13 is a diagrammatic cross-sectional view of the initial molding stage.
FIG. 14 is a diagrammatic cross-sectional view of the final position of the press in molding.
FIG. 15 is a cross-sectional view of a molded end closure.
FIG. 16 is an enlarged partial cross-sectional view of a portion of a modified edge formation on a molded end closure.
FIG. 17 is a top plan view of an alternative distribution/shaker platen design.

As shown in FIG. 13, the index table 122 has placed a cartridge 110, which houses the pre-form 230, into the press 242. As shown in FIG. 14, the press 242 then closes and press punch 248 transfers the pre-form 230 into the mold 262 by passing through the cartridge 110 and carrying the pre-form 230 with it. A vent opening 264 is located on the side of the mold 76 for pulling a vacuum or for venting the mold cavity. Stops 249 (FIG. 26) on the punch 248 can be used to regulate how far the punch enters the mold 262. When stops are used, the molding step presses to the point the stops are reached, which act as safeties to prevent the punch 248 from contacting the mold 262. When no stops are used, the press is free to close to the extent permitted by the amount of material within the mold and the hydraulic force applied and the timing of the press cycle. Free closing is preferable in this process because it produces a molded part with a more consistent density and strength. Alternately, the preform can be molded in the cartridge by upper and lower punches. Thus, it can be appreciated that the press punch can be arranged to move downwardly into the cartridge to pass the preform into a mold therebelow.

The press temperatures, pressing force, and cycle times depend upon the size, shape and desired properties of the molded part as well as the type of material being used. Table 1 summarizes the pressure to which the molded part is subjected by the fixed pump pressure and press force for a 4 inch molded part having an area of approximately 12.6 inch$^2$. The hydraulic ram area for Table 1 was approximately 56.5 inch$^2$:

TABLE 1

| PRESS FORCE (TONS) | PUMP PRESSURE (PSI) | PART PRESSURE (PSI) |
|---|---|---|
| 14 | 500 | 1100 |
| 28 | 1000 | 2300 |
| 34 | 1200 | 2700 |
| 40 | 1400 | 3200 |
| 45 | 1600 | 3600 |
| 51 | 1800 | 4000 |
| 57 | 2000 | 4500 |
| 73 | 2600 | 5850 |
| 85 | 3000 | 6750 |

Preferably, the molded part is free-pressed at high pressures, preferably 4000–5000 psi and at mold temperatures of 180°–350° F., or most preferably 4500 psi and 260° F. The pressing cycle is preferably 15–25 seconds. Steam and a vacuum may be utilized during the press cycle to assist in the polymerization of the binder. For actual productions 16–30 mold cavities can be included in the press.

Moisture must be released from the molded part during the molding cycle prior to turning into steam which can cause delamination and blistering of the part. Moisture is released by the use of vents by physically moving the punch away from the mold to allow steam to escape. Three one second vents, 5 seconds apart, are preferable to release moisture from the molded part.

Figure 26:
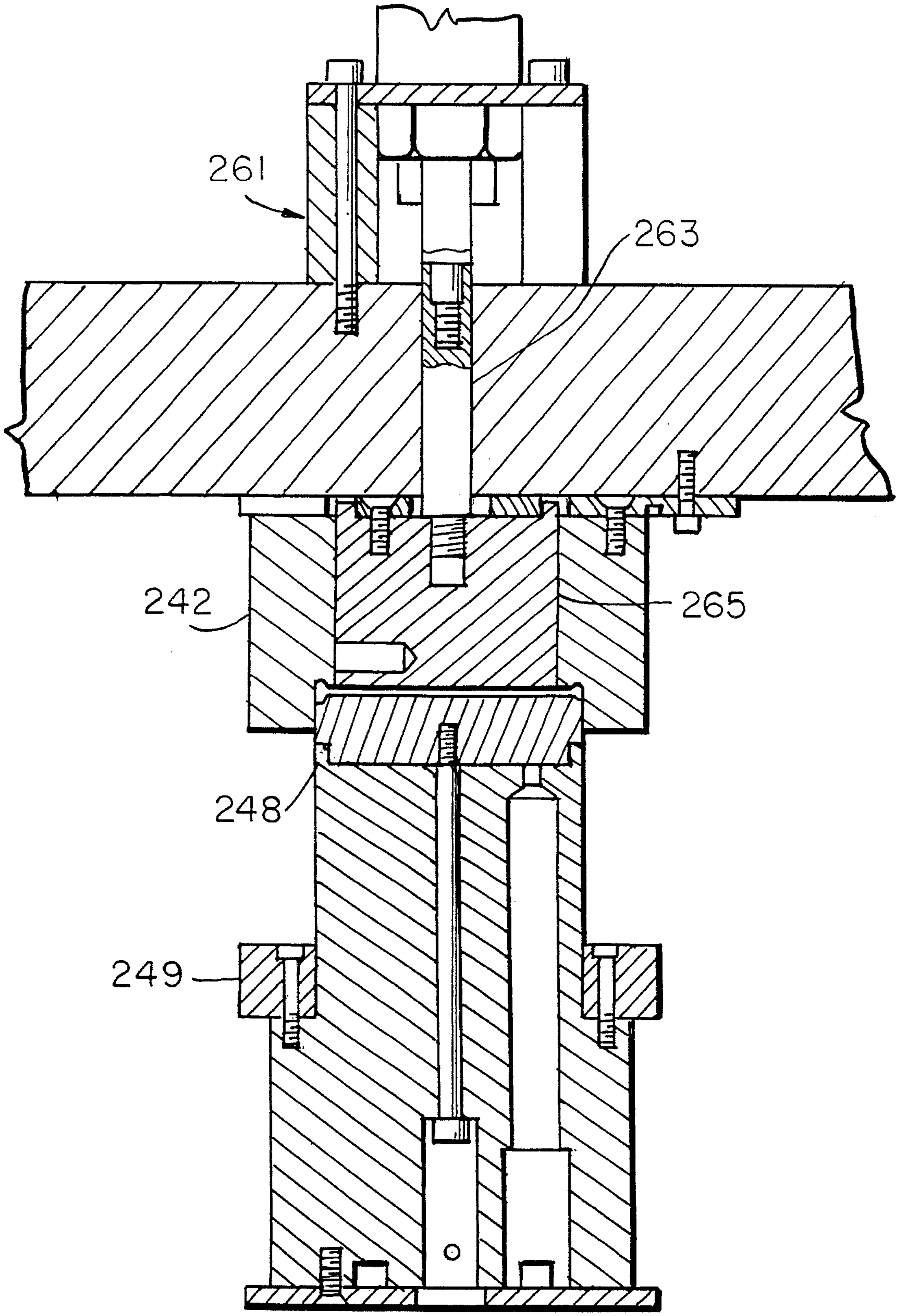
FIG. 26 is a cross-sectional view of an ejector assembly of the present invention.

After the parts are molded and the press is opened, the molded parts are ejected from the mold and returned into the cartridge 110. The ejector assembly 261 is shown in FIG. 26. In the illustrated embodiment, the ejector assembly includes a drive rod 263 which is coupled to the ejector 265. The ejector is driven downward to eject the molded part. The same cartridge that was used to transfer the pre-form into the press will again receive the molded part and is used to transfer the molded part out of the press. Once the molded part is placed in the cartridge, the cartridge can be transferred to an optional secondary process such as the application of labels, barrier coatings, laminates, or adhesives. Alternately, the cartridge 110 could be moved away from the mold and the parts ejected into a receptacle. The part can also undergo other processing steps such as punching of the part; notching or perforating the molded part; or adding attachments to the molded part. The molded part is transferred by the cartridge to an eject station where the molded part itself is ejected from the cartridge.

The amount of starting materials depends upon the required thickness of the molded part. The lower the required thickness, the less starting material that is required. A preferred density of the molded part is 0.5 to 1.5 g/cm$^3$, and most preferably 1.2 g/cm$^3$. A preferable material for the molded part contains 90–97% by weight of cellulosic fiber, 3–7% binder and 0–3% pigment. The total part weight for 4 inch diameter parts is 20–30, preferably 25 grams. The most preferable mixture contains 3–5% polypropylene. The volume of a raw fiber sample of a given weight varies widely due to the length and shape of the fibers and the corresponding amount of air contained in that sample. Molded parts according to the present invention can range from 0.1 inch$^2$ to 32 feet$^2$, and preferably 12 inch$^2$, with a thickness of 0.01 inch to 5 inches, preferably 0.08 inch.

Fiber shapes are typical of cellulosic materials; that is, the fibers are cylindrical with varying lengths. Shorter fibers and fiber fragments result in higher densities. Because the process is dry, the fibers tend to curl. The lengths of the fibers can range from 0.001 mm to 10 mm. Recycled fibers are typically less than 3 mm long.

The binder can be paper-making by-products such as lignin, agricultural by-products such as starch, synthetic polymers such as the polyolefin family and thermoset resins to a maximum weight of 15 percent. Fiber form of the binder is preferred because that form mixes well with cellulosic fiber and is readily available. Polypropylene fiber is the preferred fiber but it should be understood that other forms could also be employed. High density polyethylene is another preferred binder because it is cheaper than polypropylene fiber, is available in powder form, and has a lower flow temperature than polypropylene fiber, but high density polyethylene fiber is not readily available. Although the process also contemplates the use of liquid binders, a dry binder is preferred because it simplifies the process. The dry binders can range in size from a powder to small granules to beads approximately 2 mm in diameter. Finer granules or fibers of binder are preferred because they are similar to the cellulosic fiber, which alleviates mixing problems. Also, a tumbling mixer remixes granules or fibers that fall out of cellulosic fibers thereby avoiding the separation problem of binder and the cellulosic fibers caused by air-laying mixing. The characteristics of the granules and fibers are set forth in TABLE 2.

TABLE 2

| | RANGE | TYPICAL |
|---|---|---|
| Granules | < 20 mesh | 35 mesh |
| Fiber dia. | < 15 denier | 3 denier |
| Fiber length | 0–25 mm | 5 mm |

The size of the molded part is limited only by the amount of pressing force available. The process is preferably used to make thin molded parts having preferred thickness of about 0.05 inch to 0.25 inch. Press cycle times must be increased for thick parts in order to polymerize the binder in the center of the molded part.

The process can produce molded parts of most shapes, other than shapes that require undercut portions. FIG. 15 depicts a cross-sectional view of one form of a molded end cap for installation in a tube, generally indicated at 280, as produced according to the present invention. It will be noted that the central area 282, has a relatively thin thickness while the outer rim, generally 284, has an increased thickness as one approaches the periphery. A lip 286 may be located on the outer rim 284 to act as a stop when the molded part is installed as an end cap on a tube. Molded parts with sharp corners and edges are more difficult to produce because of the poor flow properties of the cellulosic fibers.

Parts with a varying cross-sectional thickness are generally more difficult to make but the present invention permits such types of parts to be made with uniformly consistent densities and part strengths. The distribution of raw material is critical to achieving such a uniform density in the molded part and must be adjusted for different shaped articles. FIG. 16 shows another form of an end cap 290 that is concave on both sides. The concave lower horizontal surface has a radiused surface 296 that extends toward the outer rim 288. The lip 292 has a vertical side wall at 294 that extends into a curved shoulder 298 which in turn joins another slightly tapered vertical wall 300. This follows into a radiused upper portion 302 of outer rim 288 that extends toward the central part of end cap 290. FIG. 16 also shows, in part, the upper mold 262, the mold ejector 265 and the bottom punch 248.

The molded part can be a variety of objects including closures for containers, such as can ends; cylindrical shapes for packing applications; gaskets or spacers; construction, wall, ceiling and furniture panels; parts to provide shape to automobile instrument panels, seats, visors, interior headliner, filler parts or door panels; thread spools; insulated mounting parts in radio, television and other electronic units; packing filler; packaging box or carton molded spacers; packaging stiffeners for cartons and boxes; fishing or game bait containers; core parts for laminated containers; upholstery corner and shape ybases; poker chips; party favors; biodegradable seedling containers for plants and trees; egg cartons; and shot shell wads.

FIG. 17 shows an alternative pattern for top platen 208' of the distribution plunger 142. As shown in FIGS. 6 and 7, the preferred design includes a plurality of upstanding nubs 310 arranged into a pattern when the central area of the platen 208 is free of such nubs or projections. The nubs or projections 310 can be about 0.1 inch high and have a diameter of about 0.05 inches.

Alternatively, the platen could employ an upstanding plate or rib 312 shown in dotted lines in FIG. 6. Still another alternative is the nub design in FIG. 17 where a series of curved rows each having a plurality of nubs 314 could be used.

As mentioned previously, FIG. 18 sets forth a pneumatic schematic and identifies the values that control the actuation of the pneumatically actuated elements. The unload, distribution drive motors and air jet are all part of the pre-form plan while the mold eject, eject 2 and index aspects of the process are part of the press cycle.

FIG. 19 relates to the hydraulic side of the control system and identifies the values used to control top plunger cylinders 220, 221, the distribution plunger cylinders 214, 215, kicker cylinder 246 and the main cylinder 250.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims. Thus, it is to be understood that variations in the particular invention can be made without departing from the novel aspects of this invention as defined in the claims.

What is claimed is:

1. A process for molding cellulosic fibers comprising the sequential steps of:

mixing cellulosic fibers and a binder to form a substantially homogeneous mixture;

receiving the mixture in a pre-form cartridge and distributing the mixture therein;

redistributing the mixture within the pre-form cartridge prior to molding a pre-form having a cross-section of varied thickness by imparting rotational motion to the mixture in such a manner that some of the mixture is moved toward outer peripheral edges of the pre-form cartridge; and molding the pre-form from the redistributed mixture within the pre-form cartridge, under a predetermined pressure and heat, forming a molded part having said cross-section of varied thickness and a substantially uniform density throughout.

2. The process according to claim 1 wherein the binder is selected from the group consisting of lignin based adhesives, agricultural by-products, synthetic polymers including thermoplastics and thermoset resins.

3. The process according to claim 1 wherein the binder is high density polyethylene.

4. The process according to claim 1, wherein the binder is high density polyethylene fibers.

5. The process according to claim 1, wherein the binder is high density polyethylene granules.

6. The process according to claim 1 wherein the binder is polypropylene fiber.

7. The process according to claim 1 wherein the binder is polypropylene.

8. The process according to claim 1 wherein the binder is polypropylene granules.

9. The process according to claim 1 wherein the binder is low density polyethylene.

10. The process according to claim 1 wherein the binder is low density polyethylene fiber.

11. The process according to claim 1 wherein the binder is low density polyethylene granules.

12. The process according to claim 1 wherein the binder is polyethylene granules.

13. The process according to claim 1 wherein the cellulosic fiber is recycled paper.

14. The process according to claim 1 wherein the cellulosic fiber is derived from disposable diaper scraps.

15. The process according to claim 1 further comprising the step of applying one of a laminate and coating to the pre-form prior to the molding step.

16. The process according to claim 1 wherein the molding step comprises the steps of applying steam to the pre-form and vacuuming moisture from the pre-form.

17. The process according to claim 1 wherein the molding step comprises the steps of applying steam to the pre-form while the preform is being pressed and heated and using a vacuum to remove moisture from the pre-form.

18. The process according to claim 1 wherein pressure during the molding step is 4000– 5000 psi.

19. The process according to claim 1, wherein the mixture is distributed by rotating a piston assembly disposed within the pre-form cartridge such that some of the mixture is moved toward outer peripheral edges of the pre-form and toward vertical sidewalls of the piston assembly.

20. The process according to claim 1, further comprising settling the mixture, after redistributing the mixture, by imparting vibrating motion to the mixture.

21. The process according to claim 1, further comprising settling the mixture, after redistributing the mixture, by imparting rotating motion to the mixture.

22. A dry process for molding paper comprising the sequential steps of:

processing the paper into fibers;

mixing the paper fibers and a thermosetting binder to form a substantially homogeneous mixture;

distributing the mixture in a cartridge and forming therein a desired pre-form having a non-uniform cross-section;

transferring the pre-form to a mold;

molding the pre-form to form a molded part having a substantially uniform density by heat and pressures of 4000–5000 psi; and ejecting the molded part from the mold.

* * * * *